US012498098B2

(12) United States Patent
Asano

(10) Patent No.: US 12,498,098 B2
(45) Date of Patent: Dec. 16, 2025

(54) LIGHT SOURCE MODULE, VEHICLE LIGHT FIXTURE, AND AUTOMOBILE

(71) Applicant: Nichia Corporation, Anan (JP)

(72) Inventor: Takuma Asano, Yokohama (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 18/677,051

(22) Filed: May 29, 2024

(65) Prior Publication Data

US 2024/0401767 A1 Dec. 5, 2024

(30) Foreign Application Priority Data

Jun. 2, 2023 (JP) ................................ 2023-091717

(51) Int. Cl.
*F21S 45/47* (2018.01)
*F21S 41/143* (2018.01)
*F21S 41/153* (2018.01)

(52) U.S. Cl.
CPC ............ *F21S 45/47* (2018.01); *F21S 41/143* (2018.01); *F21S 41/153* (2018.01)

(58) Field of Classification Search
CPC ........ F21S 45/47; F21S 41/143; F21S 41/153; F21S 41/151; F21S 41/192; F21S 45/48
See application file for complete search history.

(56) References Cited

U.S. PATENT DOCUMENTS 7,611,270 B1 * 11/2009 Lyons .................. B60Q 1/2611 362/543
9,318,536 B2 * 4/2016 Burrows ................ H05B 45/60
2004/0257827 A1 12/2004 Ishida et al.
2005/0018443 A1 1/2005 Tsukamoto
2016/0258611 A1 9/2016 Takahashi et al.
2018/0118097 A1 * 5/2018 Thompson .......... F21V 23/0407
2018/0292740 A1 10/2018 Takagi
2021/0058027 A1 * 2/2021 Oakley, Jr. .............. H02S 40/34
2022/0205603 A1 * 6/2022 Go ........................ F21S 41/285
2022/0357029 A1 * 11/2022 de Kreij .................. F21V 23/06
2024/0019102 A1 * 1/2024 Ichikawa ................ F21S 45/47

FOREIGN PATENT DOCUMENTS

JP 3066834 U 3/2000
JP 2005-011761 A 1/2005
JP 2005-044683 A 2/2005
JP 2016-164922 A 9/2016
JP 2017-134186 A 8/2017
JP 2018-180107 A 11/2018

* cited by examiner

*Primary Examiner* — Evan P Dzierzynski
(74) *Attorney, Agent, or Firm* — Kim & Stewart LLP

(57) ABSTRACT

A light source module includes a housing, a light source substrate, a light-emitting element, an optical component, and a heat dissipation plate. The light source substrate is mounted to the housing. The light-emitting element is disposed on the light source substrate. The optical component is provided inside the housing, and light irradiated from the light-emitting element travels through the optical component and exits out of the front surface of the housing. The heat dissipation plate is mounted to the light source substrate. The heat dissipation plate includes a mounting part mounted to the light source substrate, and an extension part extending from the mounting part along the outer surface of the housing. The outer surface of the housing includes a covered part covered with the extension part, and an exposed part that is not covered with the extension part.

20 Claims, 13 Drawing Sheets

LIGHT SOURCE MODULE, VEHICLE LIGHT FIXTURE, AND AUTOMOBILE

CROSS-REFERENCE TO RELATED APPLICATION

This application claims priority to Japanese Patent Application No. 2023-091717, filed on Jun. 2, 2023, the disclosure of which is hereby incorporated by reference in its entirety.

BACKGROUND

Technical Field

Embodiments relate to a light source module, a vehicle light fixture, and an automobile.

Background Art

A vehicle known in the art includes a headlamp that uses multiple light source modules to illuminate frontward (JP-A 2005-11761 (Kokai)).

SUMMARY

An embodiment provides a light source module that is easy to mount, a vehicle light fixture in which the light source module is mounted, and an automobile including the vehicle light fixture.

A light source module according to an embodiment includes a housing, a light source substrate, a light-emitting element, an optical component, and a heat dissipation plate. The light source substrate is mounted to the housing. The light-emitting element is disposed on the light source substrate. The optical component is provided inside the housing, and light irradiated from the light-emitting element travels through the optical component and exits out of the front surface of the housing. The heat dissipation plate is mounted to the light source substrate. The heat dissipation plate includes a mounting part mounted to the light source substrate, and an extension part extending from the mounting part along the outer surface of the housing. The outer surface of the housing includes a covered part covered with the extension part, and an exposed part that is not covered with the extension part.

A vehicle light fixture according to an embodiment includes a main part, a first light source module and a second light source module. The main part includes a first slot and a second slot. The first light source module is attached to the first slot. The second light source module is attached to the second slot. The light distribution characteristics of the first light source module are different from the light distribution characteristics of the second light source module. The first light source module is attachable to the second slot; and the second light source module is attachable to the first slot.

An embodiment provides a light source module that is easy to mount, a vehicle light fixture in which the light source module is mounted, and an automobile including the vehicle light fixture.

DETAILED DESCRIPTION

A light source module, a vehicle light fixture, and an automobile according to embodiments will be described hereinafter with reference to FIGS. 1 to 15.

Figure 1:
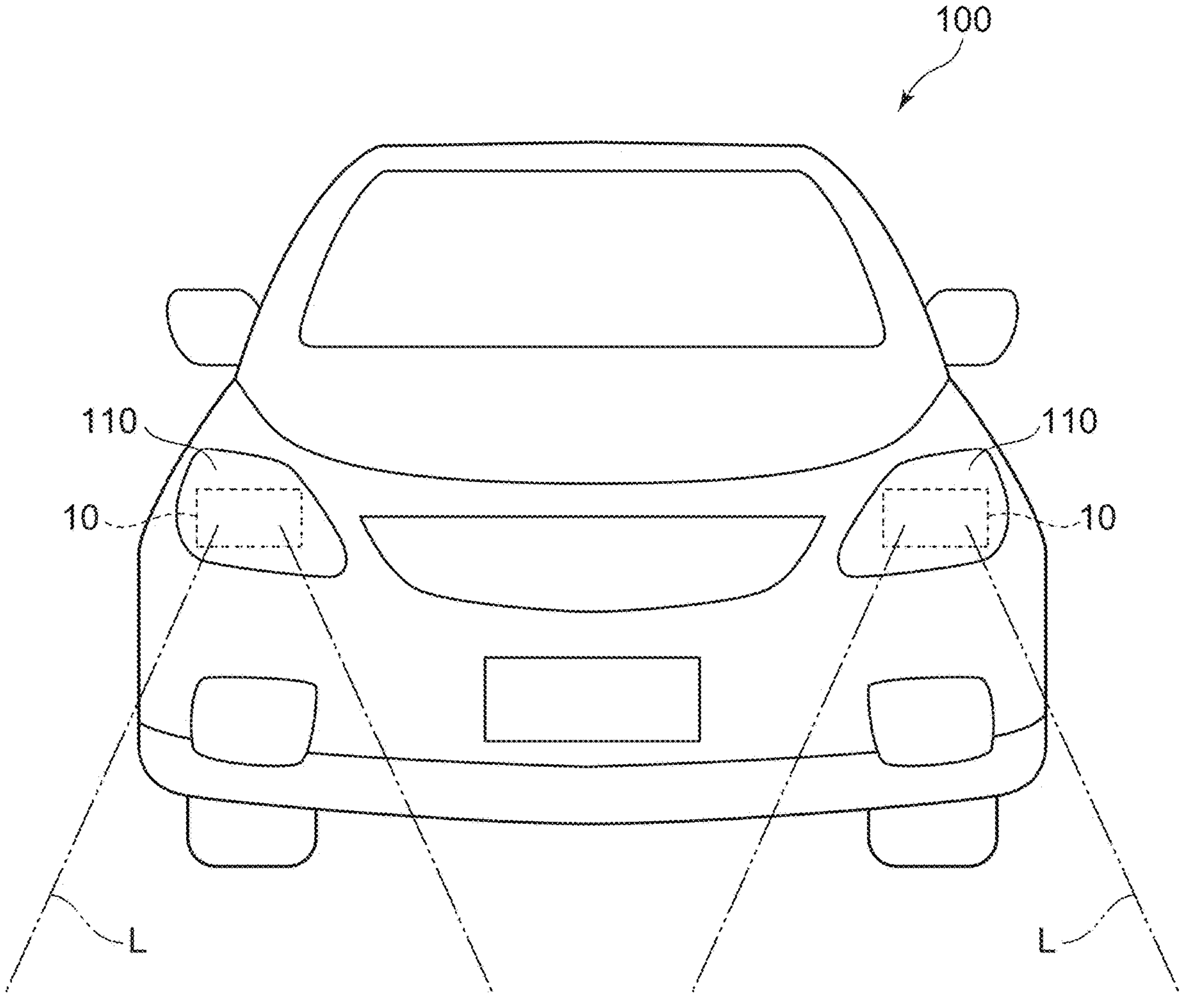
FIG. 1 illustrates a front view of an automobile that includes a vehicle light fixture including a light source module according to an embodiment.

FIG. 1 illustrates a front view of an automobile that includes a vehicle light fixture including a light source module according to an embodiment.

For example, a vehicle light fixture 10 is used as a headlamp of a vehicle such as an automobile 100, etc. The vehicle light fixture 10 illuminates frontward of the automobile 100. The vehicle light fixture 10 includes a main part 20, and the light source module 30 mounted to the main part 20. The main part 20 may be a body formed integrally with a vehicle body, or may be detachable from the vehicle body.

Figure 2:
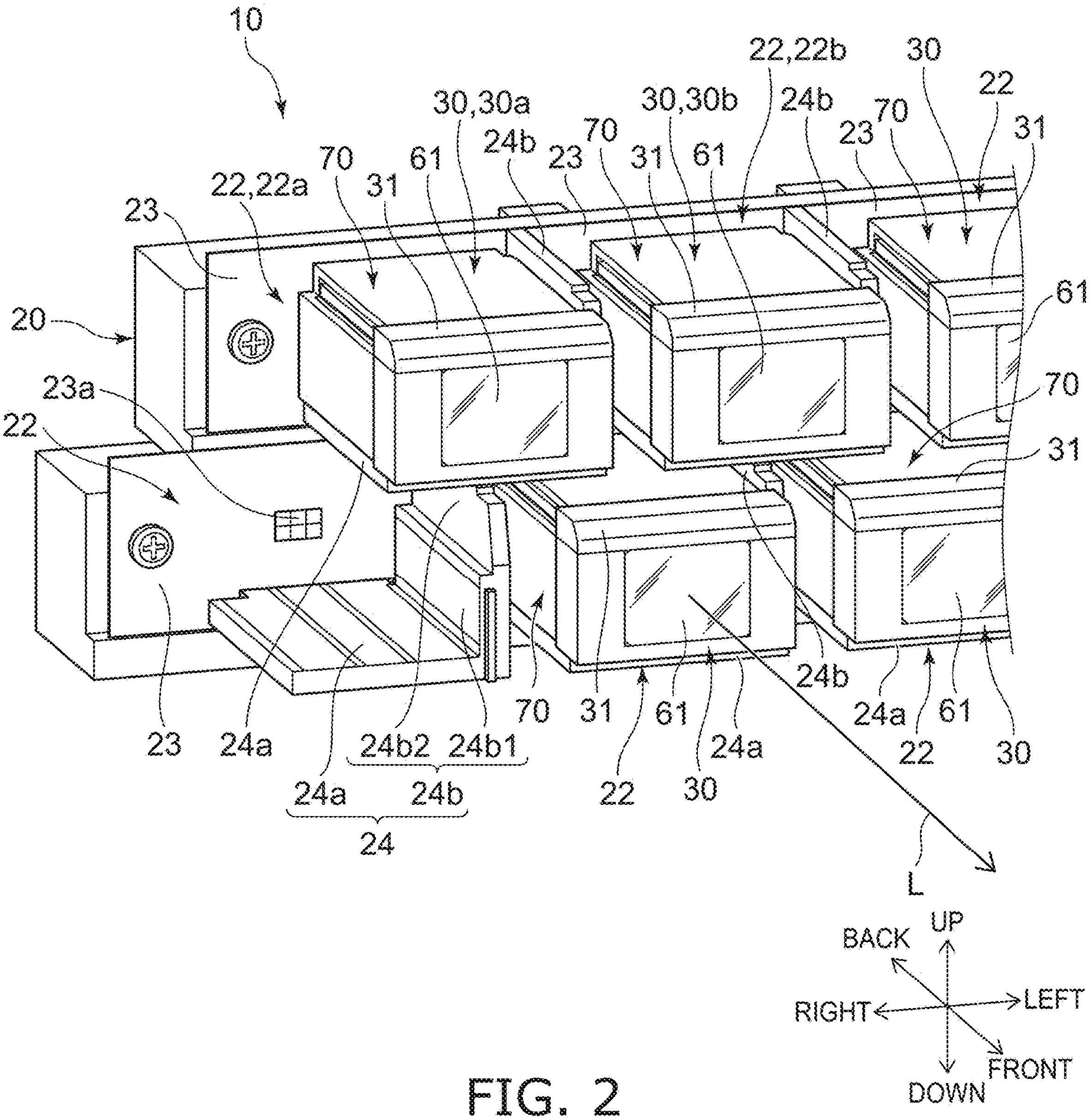
FIG. 2 illustrates a perspective view of the vehicle light fixture in a state in which the light source module is mounted in a slot of the vehicle light fixture.

FIG. 2 illustrates a perspective view of the vehicle light fixture 10 in a state in which the light source module 30 is mounted in a slot of the vehicle light fixture 10.

Figure 3:
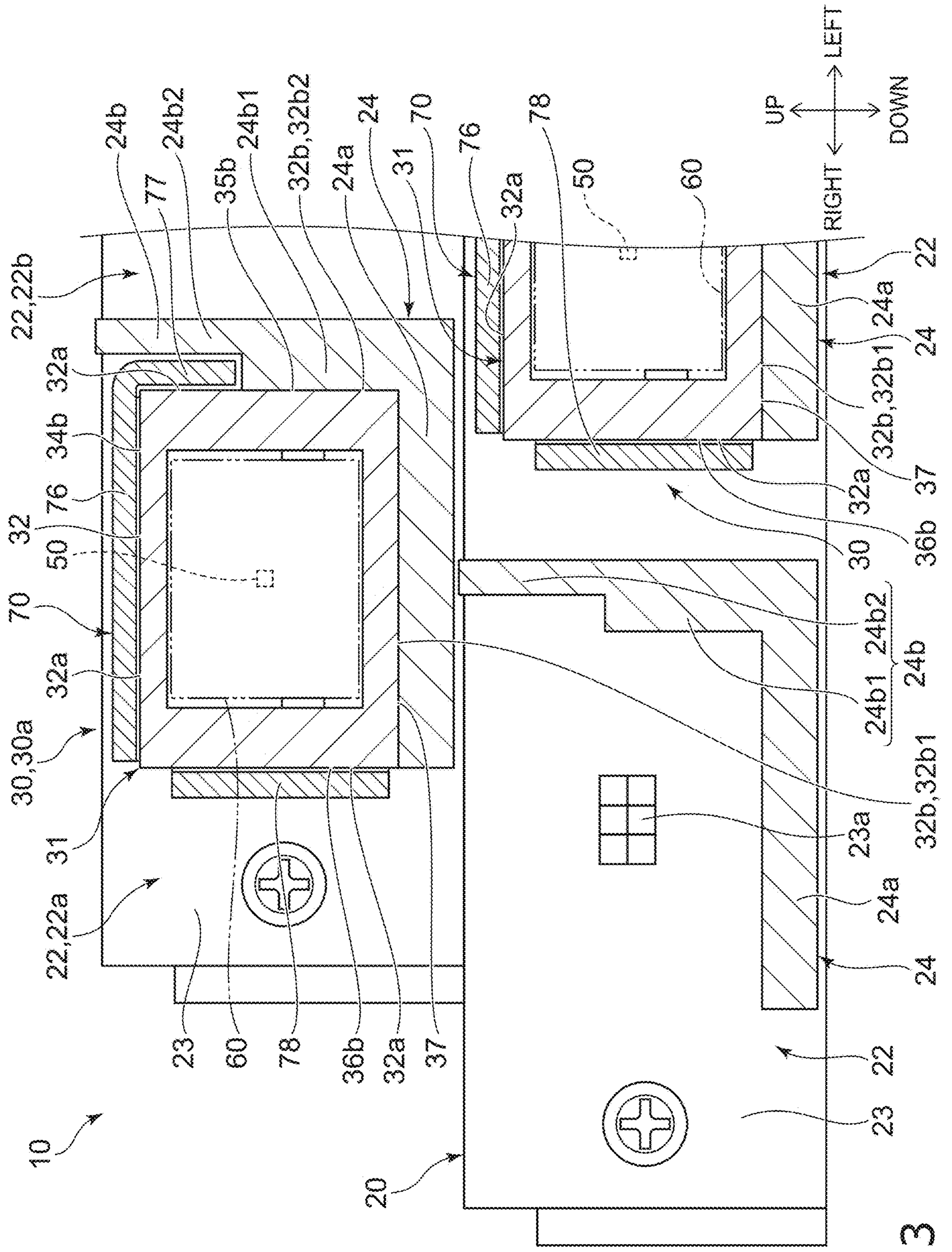
FIG. 3 illustrates an enlarged cross-sectional view of a part of the vehicle light fixture showing a contact state between the slot and a housing of the light source module.

FIG. 3 illustrates a cross-sectional view of the vehicle light fixture 10 showing a contact state between the slot and a housing of the light source module 30.

The vehicle light fixture 10 is partially enlarged in FIGS. 2 and 3. The slot at the lower right part is shown with the light source module 30 detached for convenience of description in FIGS. 2 and 3.

In the description of the embodiments described below, as shown in FIG. 2, the direction in which the light source module 30 irradiates light L is referred to as "front/frontward", and the opposite direction is referred to as "back/backward/behind". In the description of the embodiment, "up/upward/above/higher than", "down/downward/below/lower than", "right/rightward", and "left/leftward" are referenced to the vehicle facing frontward. These orientations are not limited to orientations when using the light source module according to the embodiment.

As shown in FIG. 1, the main part 20 is positioned behind a light-transmitting headlamp cover 110. The main part 20 includes multiple slots 22 of which number and arrangement are set based on the design and/or light distribution characteristics of the vehicle light fixture 10. The light source modules 30 are mountable in the slots 22, respectively. The slot 22 includes a back surface part 23, and a mounting part 24 positioned frontward of the back surface part 23; and the light source module 30 is mounted to the mounting part 24.

The back surface part 23 includes a connection part 23*a* to which a connector 95 of the light source module 30 is connected. The connection part 23*a* is electrically connected to a battery of the automobile 100. The mounting part 24 includes a bottom surface part 24*a* positioned below the connection part 23*a*, and a vertical surface part 24*b* that is positioned sideward 10 of the connection part 23*a* and extends upward from the bottom surface part 24*a*. In other words, the mounting part 24 is formed in an L-shape formed with the bottom surface part 24*a* and the vertical surface part 24*b*.

The bottom surface part 24*a* and the vertical surface part 24*b* protrude frontward from the back surface part 23. In a specific implementation, only one of the bottom surface part 24*a* or the vertical surface part 24*b* of the mounting part 24 may protrude from the back surface part 23. The bottom surface part 24*a* supports the light source module 30 from below. The vertical surface part 24*b* abuts a left side surface 35 (a second surface 32*b*2) of the light source module 30.

As shown in FIGS. 2 and 3, the vertical surface part 24*b* is formed in a step shape in the lateral direction, and formed with a first section 24*b*1 positioned at the bottom surface part 24*a* side and a second section 24*b*2 positioned above the first section 24*b*1. The first section 24*b*1 abuts the second surface 32*b*2 of the light source module 30. On the other hand, the second section 24*b*2 faces a heat dissipation plate 70 described below. In other words, the step part of the vertical surface part 24*b* is the part at which the heat dissipation plate 70 of the light source module 30 is positioned. The mounting work of mounting the light source module 30 in the slot 22 is described below.

The light source module 30 will be described in detail with reference to FIGS. 4-13.

Figure 4:
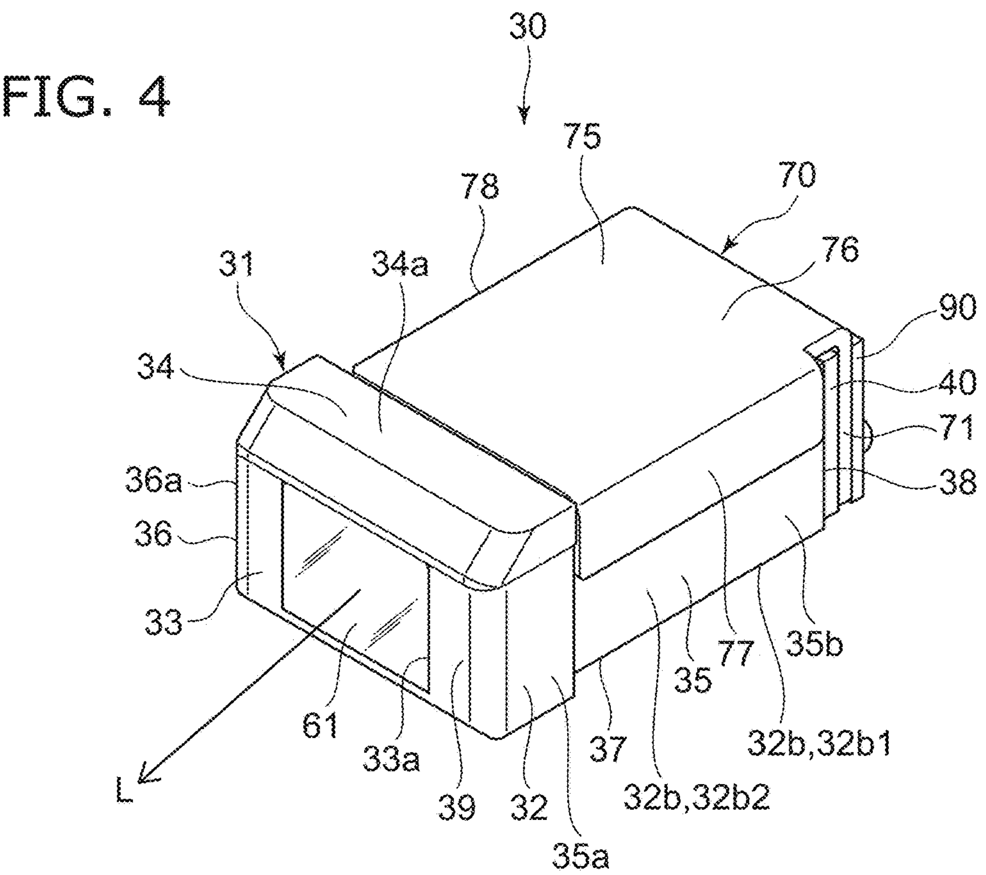
FIG. 4 illustrates a perspective view of the light source module when viewed obliquely from frontward.

FIG. 4 illustrates a perspective view of the light source module 30 when viewed obliquely from frontward.

Figure 5:
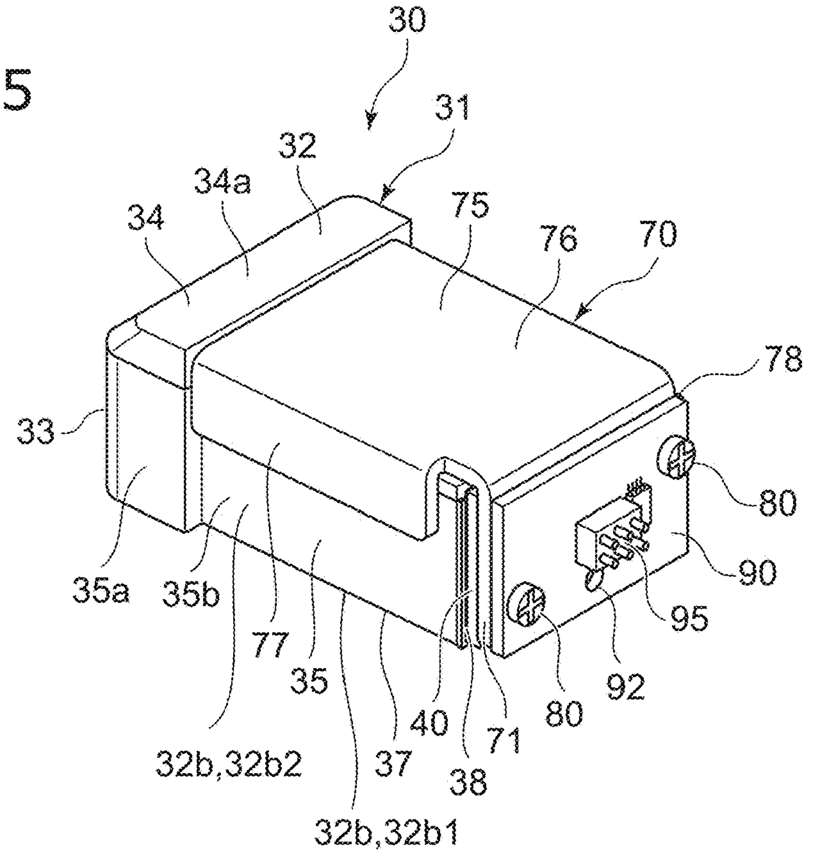
FIG. 5 illustrates a perspective view of the light source module when viewed obliquely from backward.

FIG. 5 illustrates a perspective view of the light source module 30 when viewed obliquely from backward.

Figure 6:
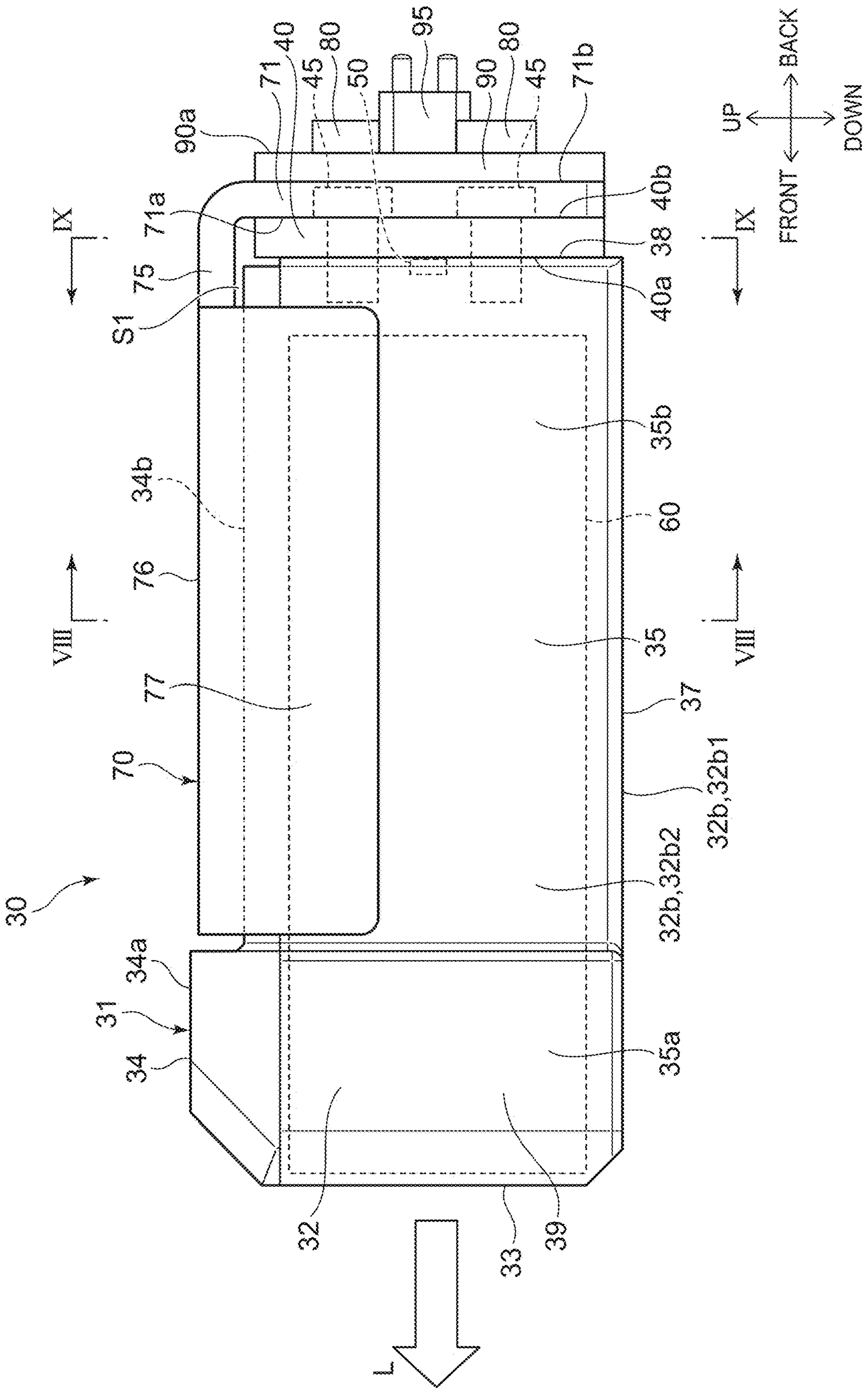
FIG. 6 illustrates a side view of the light source module when viewed from the left.

FIG. 6 illustrates a side view of the light source module 30 when viewed from the left.

Figure 7:
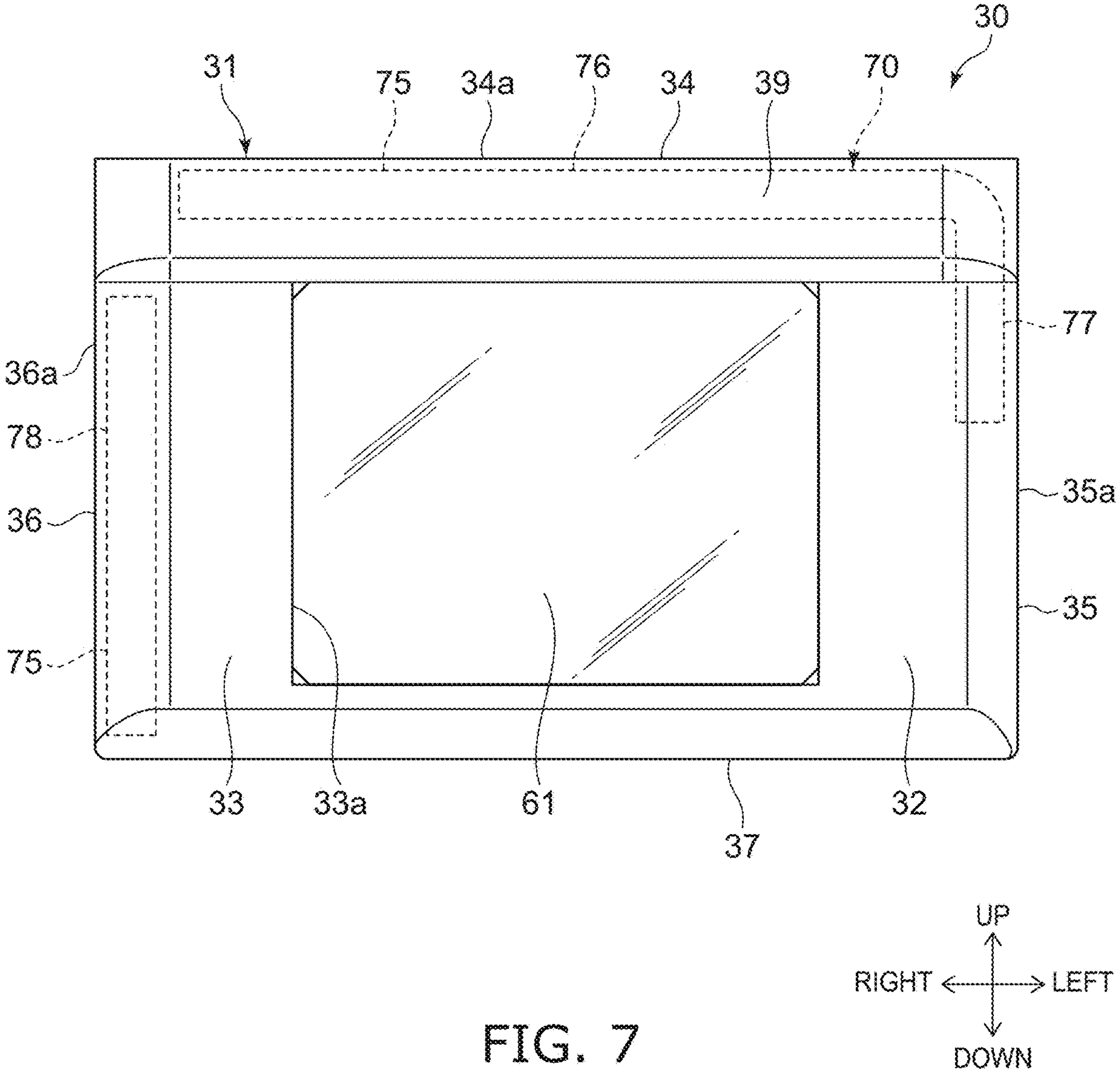
FIG. 7 illustrates a front view of the light source module when viewed from the front.

FIG. 7 illustrates a front view of the light source module 30 when viewed from the front.

Figure 8:
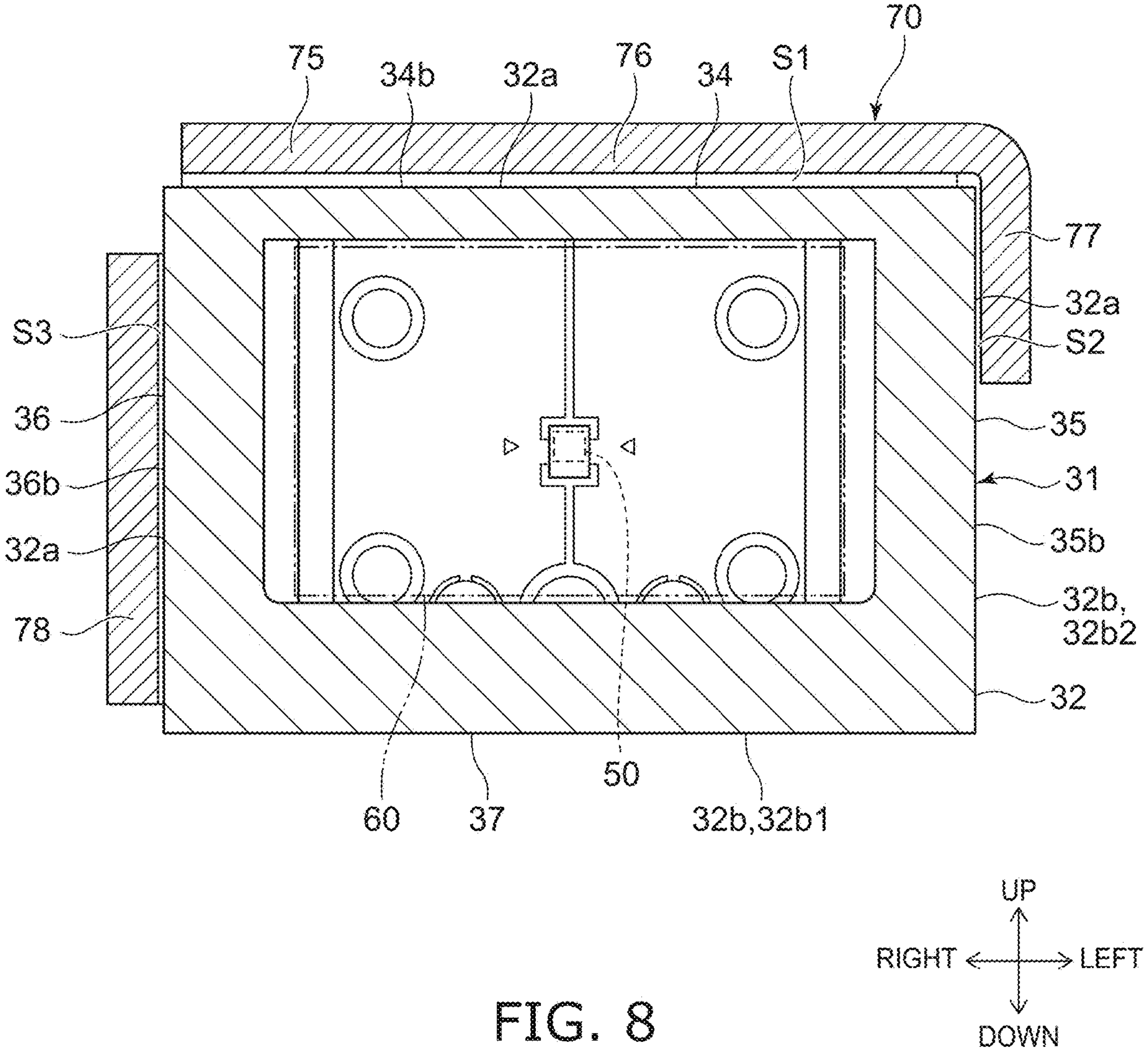
FIG. 8 illustrates a cross-sectional view of the light source module when viewed from an arrow VIII-VIII-direction in FIG. 6.

FIG. 8 illustrates a cross-sectional view of the light source module 30 when viewed from the arrow VIII-VIII-direction in FIG. 6.

Figure 9:
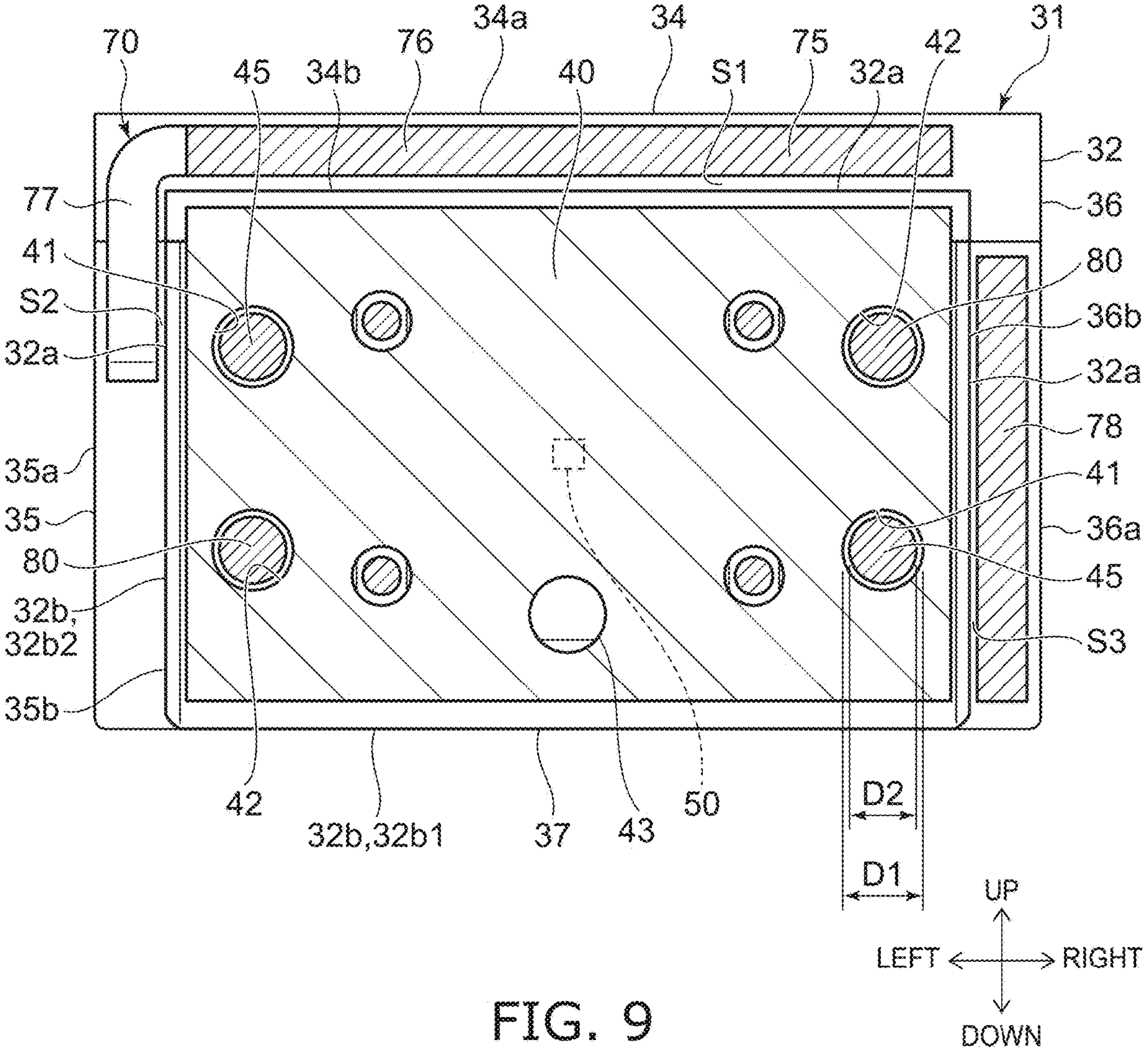
FIG. 9 illustrates a cross-sectional view of the light source module when viewed from an arrow IX-IX-direction in FIG. 6.

FIG. 9 illustrates a cross-sectional view of the light source module 30 when viewed from the arrow IX-IX-direction in FIG. 6.

Figure 10:
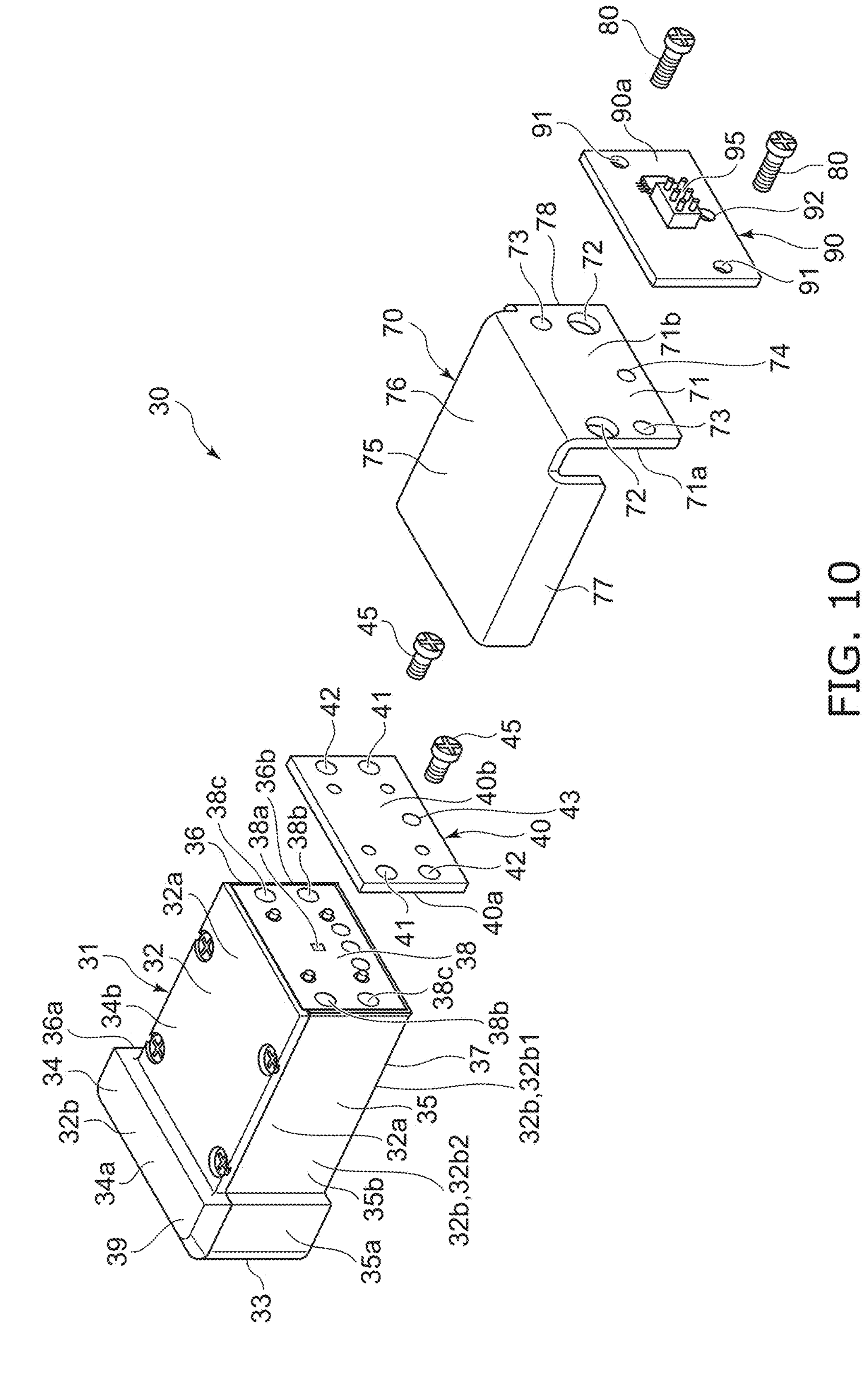
FIG. 10 illustrates an exploded perspective view of the vehicle light fixture in a state in which a light source substrate, a heat dissipation plate, and a circuit board are detached from the housing.

FIG. 10 illustrates an exploded perspective view of the light source module 30 in a state in which a light source substrate, the heat dissipation plate 70, and a circuit board are detached from a housing.

Figure 11:
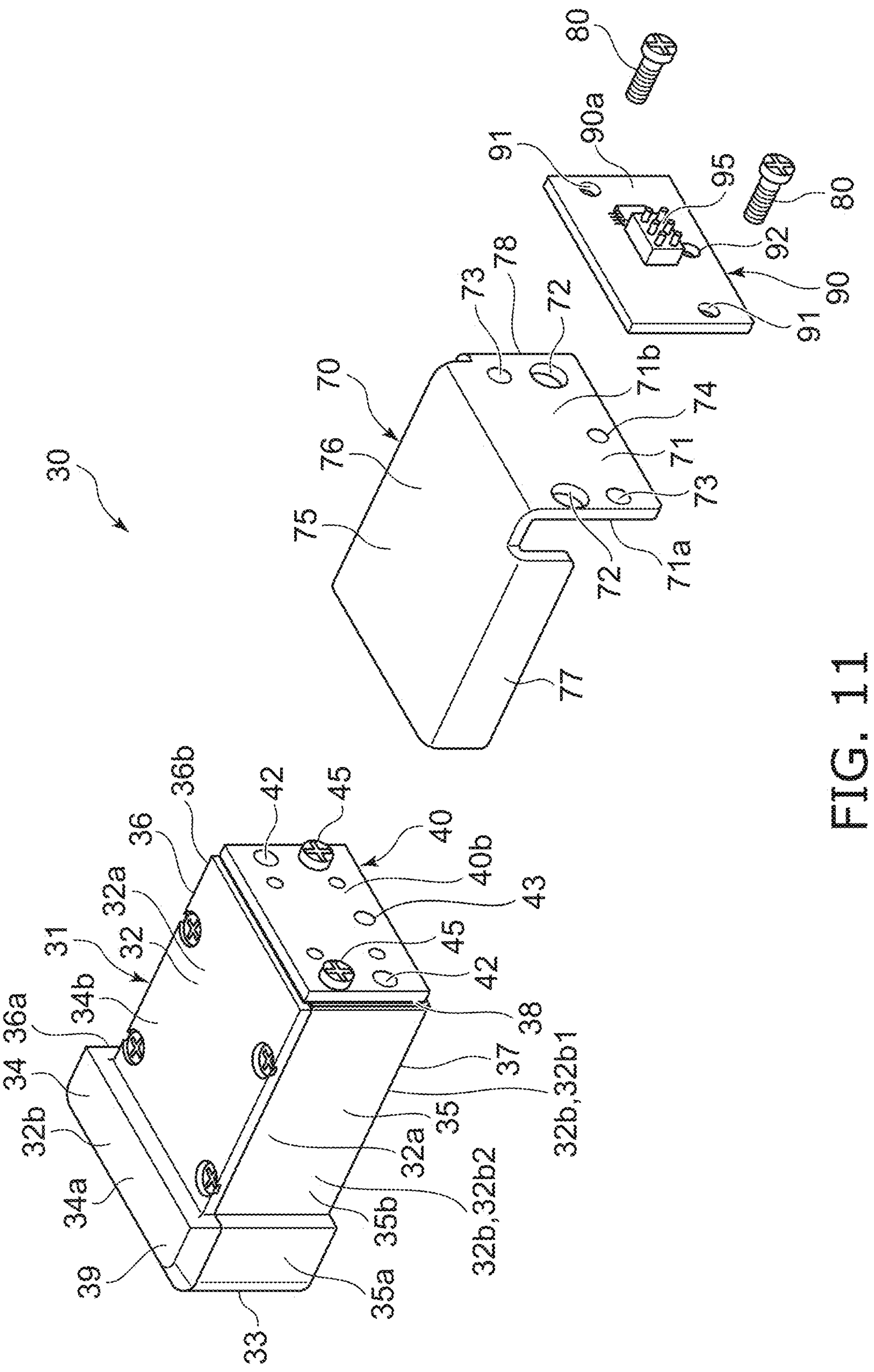
FIG. 11 illustrates an exploded perspective view of the vehicle light fixture in a state in which the light source substrate is mounted to the housing in FIG. 10.

FIG. 11 illustrates an exploded perspective view of the light source module 30 in a state in which the light source substrate is mounted to the housing in FIG. 10.

Figure 12:
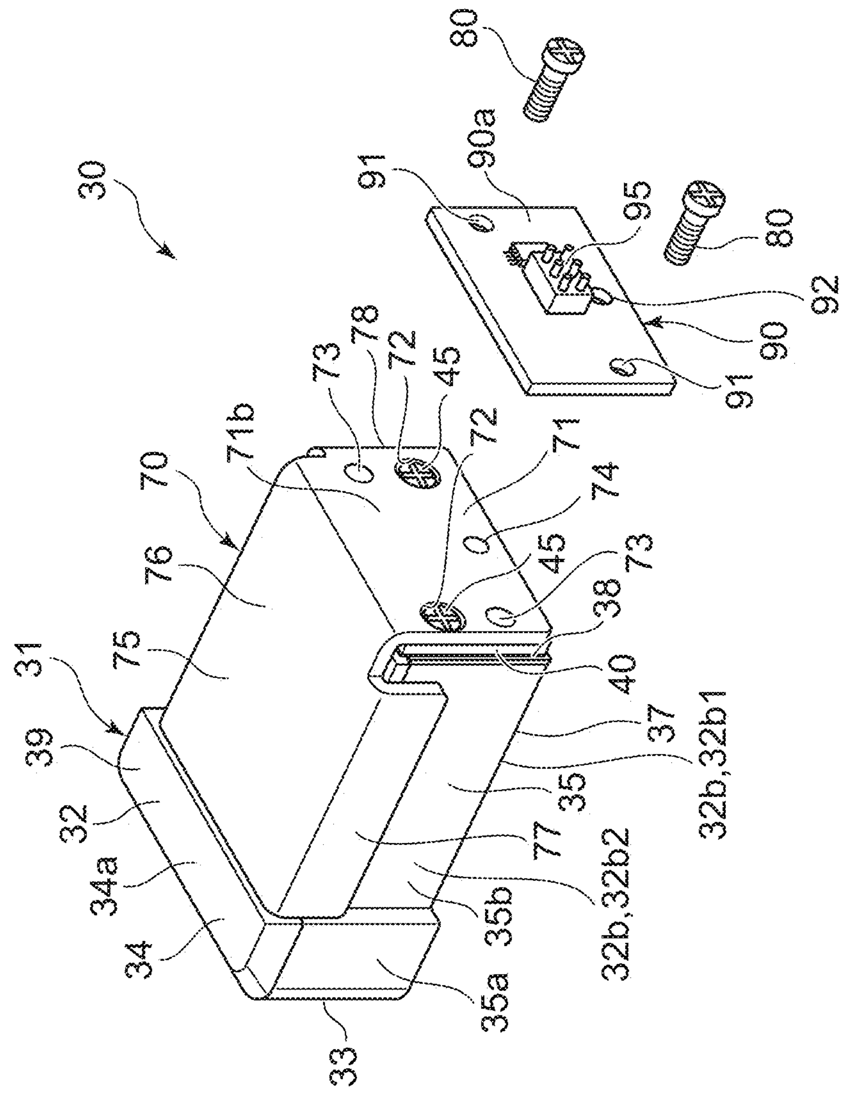
FIG. 12 illustrates an exploded perspective view of the vehicle light fixture in a state in which the heat dissipation plate is mounted to the housing in FIG. 11.

FIG. 12 illustrates an exploded perspective view of the light source module 30 in a state in which the heat dissipation plate is mounted to the housing in FIG. 11.

Figure 13:
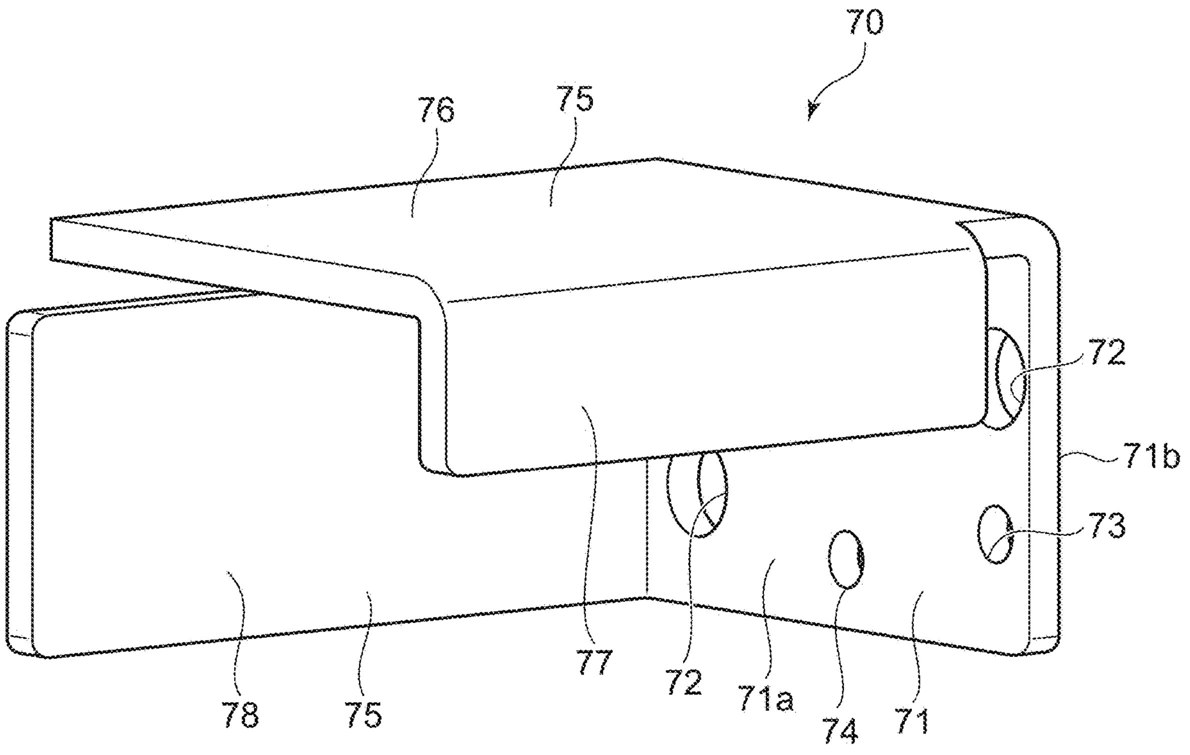
FIG. 13 illustrates a perspective view of the heat dissipation plate alone.

FIG. 13 illustrates a perspective view of the heat dissipation plate alone.

The light source module 30 is mounted to the slot 22 of the main part 20. The light source module 30 includes a housing 31, a light source substrate 40 mounted to the housing 31, a light-emitting element 50 located on the light source substrate 40, an optical component 60 that is located inside the housing 31, and the heat dissipation plate 70 attached to the light source substrate 40. Light irradiated from the light-emitting element 50 travels through the optical component 60 and exits out of the front surface of the housing.

The housing 31 forms the contour of the light source module 30. For example, the housing 31 has a box shape made of a resin material such as polycarbonate, etc. Outer surfaces 32 of the housing 31 include a front surface 33, an upper surface 34, a left side surface 35, a right side surface 36, a lower surface 37, and a back surface 38.

The front surface 33 is a part through which the light L is irradiated outside the housing 31. The front surface 33 has an opening 33*a*. A lens 61 that is included in the optical component 60 described below is provided in the opening 33*a*.

The upper surface 34 extends backward from the upper end of the front surface 33. A member forming the upper surface 34 is detachable with respect to one or more members forming the front surface 33, the left side surface 35, the right side surface 36, and the back surface 38. In other words, the upper surface 34 is included in a lid body sealing the top opening of the housing 31. The housing 31 is such that the optical component 60 can be located inside the housing 31 when the upper surface 34 is detached.

The upper surface 34 is formed in a step shape in the vertical direction, and is formed with an upper step part 34*a* positioned at the front surface 33 side and a lower step part 34*b* positioned lower than the upper step part 34*a*. The dimension of the housing between the upper step part 34*a* and the lower step part 34*b* is greater than the thickness of the heat dissipation plate 70 described below. The upper step part 34*a* is not covered with the heat dissipation plate 70. In other words, the upper step part 34*a* is positioned further toward the front surface 33 side than the heat dissipation plate 70.

The left side surface 35 extends backward from the left end of the front surface 33. The left side surface 35 is formed in a step shape in the lateral direction and formed with an upper step part 35*a* positioned at the front surface 33 side and a lower step part 35*b* positioned further rightward than the upper step part 35*a*. The dimension of the housing 31 between the upper step part 35*a* and the lower step part 35*b* is greater than the thickness of the heat dissipation plate 70 described below. The upper step part 35*a* is not covered with the heat dissipation plate 70. In other words, the upper step part 35*a* is positioned further toward the front surface 33 side than the heat dissipation plate 70.

The right side surface 36 extends backward from the right end of the front surface 33. The right side surface 36 is formed in a step shape in the lateral direction and formed with an upper step part 36*a* positioned at the front surface 33 side and a lower step part 36*b* positioned further leftward of the upper step part 36*a*. The dimension of the housing 31 between the upper step part 36*a* and the lower step part 36*b* is greater than the thickness of the heat dissipation plate 70 described below. The upper step part 36*a* is not covered with the heat dissipation plate 70. In other words, the upper step part 36*a* is positioned further toward the front surface 33 side than the heat dissipation plate 70.

The lower surface 37 extends backward from the lower end of the front surface 33. The lower surface 37 is configured to abut the bottom surface part 24*a* of the slot 22. The back surface 38 seals the back end side of the upper surface 34, the left side surface 35, the right side surface 36, and the lower surface 37. The light source substrate 40 described below is mounted to the back surface 38.

As shown in FIG. 10, the back surface 38 includes a through-hole 38*a* at the central part of the back surface 38; and the through-hole 38*a* penetrates the housing 31. The light-emitting element 50 that is located at the light source substrate 40 is inserted into the through-hole 38*a*. The back surface 38 also includes threaded holes 38*b* for mounting the light source substrate 40, and threaded holes 38*c* for mounting the heat dissipation plate 70. Two threaded holes 38*b* and two threaded holes 38*c* are each separated along diagonals of the back surface 38.

The light source substrate 40 is mounted to the back surface 38 of the housing 31. The light source substrate 40 is formed of a metal material (e.g., a copper material) in a plate shape. The light source substrate 40 includes insertion holes 41 through which screws 45 for mounting the light source substrate 40 to the housing 31 are inserted, and insertion holes 42 through which screws 80 for mounting the heat dissipation plate 70 to the housing 31 are inserted.

The insertion holes 41 are located at positions corresponding to the threaded holes 38*b* of the housing 31, and extend between a front surface 40*a* and a back surface 40*b* of the light source substrate 40. The insertion holes 42 are located at positions corresponding to the threaded holes 38*c* of the housing 31, and extend between the front surface 40*a* and the back surface 40*b* of the light source substrate 40. The mounting work of mounting the light source substrate 40 is described below.

The light-emitting element 50 is located at the front surface 40*a* of the light source substrate 40. The light-emitting element 50 is located at a position corresponding to the through-hole 38*a* of the back surface 38 of the housing 31. The light-emitting element 50 is positioned inside the through-hole 38*a* when the light source substrate 40 is mounted to the back surface 38. The light-emitting element 50 may protrude through the through-hole 38*a* into the interior of the housing 31. For example, the light-emitting element 50 is made of an LED, and irradiates light toward the interior of the housing 31. The configuration is not limited to the light-emitting element 50 being positioned in the through-hole 38*a*; a package that covers the light-emitting element 50, etc., may be positioned in the through-hole 38*a*.

The light-emitting element 50 may include a wavelength conversion member such as a phosphor, etc. The color of the light emitted from the light-emitting element 50 is arbitrary. For example, when used as a headlamp of an automobile, the correlated color temperature may be white of 5,000 K to 7,000 K by using a blue semiconductor light-emitting element and a yellow phosphor.

The optical component 60 is located inside the housing 31. The light irradiated from the light-emitting element 50 travels through the optical component 60 and exits out of the front surface of the housing 31. The optical component 60 includes, for example, various lenses (only the lens 61 located at the front surface 33 is illustrated), a shade (not illustrated) that forms a light-dark boundary of the light, etc. The light distribution characteristics of the light source module 30 are set by the optical component 60. For example, the shade can form a cutoff line that cuts the upward light of the headlight for when oncoming vehicles are passed.

The heat dissipation plate 70 is mounted to the light source substrate 40. The heat dissipation plate 70 is made of a metal material (e.g., an aluminum material), and functions as a heat sink of the light source substrate 40 and the light-emitting element 50. For example, the heat dissipation plate 70 is formed by bending a single metal plate. For example, the heat dissipation plate 70 includes a one-piece metal plate, which covers at least a part of the back surface 38, and is bent to cover at least a part of at least one of the upper surface 34, the left side surface 35, or the right side surface 36. The one-piece metal plate may be formed by bending a single metal plate to easily provide the exterior shape of the heat dissipation plate 70 described below.

The heat dissipation plate 70 includes a mounting part 71 mounted to the back surface 40*b* of the light source substrate 40, and an extension part 75 extending from the mounting part 71 along a part of the outer surface 32 of the housing 31. The extension part 75 is formed to cover only a part of the outer surfaces 32 of the housing 31. In other words, the outer surfaces 32 of the housing 31 include a covered part 32*a* covered with the extension part 75, and an exposed part 32*b* that is exposed externally. The exposed part 32*b* includes a part that abuts the slot 22 when the light source module 30 is mounted in the slot 22. The exposed part 32*b* is described below.

The mounting part 71 is in thermal contact with the back surface 40*b* of the light source substrate 40. In such a case, grease or the like may be coated between the mounting part 71 and the light source substrate 40. That is, the mounting part 71 may or may not be in physical contact with the back surface 40*b*. For example, the mounting part 71 physically contacts the entire back surface 40*b* of the light source substrate 40. As a result, the heat that is emitted from the light source substrate 40 is efficiently conducted to the mounting part 71.

The mounting part 71 includes holes 72 at positions corresponding to the insertion holes 41 of the light source substrate 40, respectively. For example, the holes 72 extend from a front surface 71*a* toward a back surface 71*b* of the mounting part 71. In the illustrated example, the holes 72 extend through the mounting part 71 in the thickness direction. The holes 72 may be sealed at the back surface 71*b*. The heads of the screws 45 for mounting the light source substrate 40 are inserted into the holes 72. In other words, the hole diameters of the holes 72 are formed to be larger than the exterior shapes of the heads of the screws 45. Also, the thickness of the mounting part 71 is formed to be greater than the thickness of the heads of the screws 45.

The mounting part 71 includes insertion holes 73 at positions corresponding to the insertion holes 42 of the light source substrate 40, respectively. For example, the insertion holes 73 extend from the front surface 71*a* toward the back surface 71*b* of the mounting part 71. The screws 80 for mounting the heat dissipation plate 70 to the light source substrate 40 are inserted into the insertion holes 73, respectively. The heat dissipation plate 70 is mounted by the screws 80 in a state in which the mounting part 71 abuts the light source substrate 40. In the illustrated example, the screws 80 fasten both the heat dissipation plate 70 and a circuit board 90 described below. In the example, the screws 80 engage the threaded holes 38*c* of the housing 31. Alternatively, for example, the insertion holes 42 of the light source substrate 40 may be threaded holes; and the screws 80 may engage the threaded holes (i.e., the insertion holes 42) of the light source substrate 40.

The extension part 75 covers a part of the outer surfaces 32 of the housing 31. In such a case, the extension part 75 does not contact the housing 31. In other words, only the mounting part 71 of the heat dissipation plate 70 contacts the light source substrate 40; and the heat dissipation plate 70 does not contact the housing 31. As a result, the heat dissipation plate 70 suppresses conduction of heat from the extension part 75 to the housing 31.

The extension part 75 includes an upper part 76 extending frontward from the upper end of the mounting part 71, a left part 77 extending downward from the left end of the upper part 76, and a right part 78 extending frontward from the right end of the mounting part 71. The left part 77 may be connected to the mounting part 71, and may not be connected to the upper part 76. The right part 78 may be connected to the upper part 76 similarly to the left part 77.

It is sufficient for at least one of the upper part 76, the left part 77, or the right part 78 of the extension part 75 to be connected to the mounting part 71. In other words, the heat dissipation plate 70 includes the mounting part 71, and at least one extension part 75 extending frontward from the mounting part 71. In other words, the heat dissipation plate 70 is formed in at least an L-shape formed with the mounting part 71 and the extension part 75.

As shown in FIGS. 6, 8, 9, and 12, the upper part 76 extends along the upper surface 34 of the housing 31. Specifically, the upper part 76 extends along the lower step part 34*b* in a state in which a gap S1 is formed between the upper part 76 and the lower step part 34*b* of the upper surface 34. In other words, the upper part 76 is positioned above the lower step part 34*b*, and extends parallel to the lower step part 34*b*. In the example, the upper part 76 covers the greater part of the lower step part 34*b* from above. The upper part 76 may cover one part of the lower step part 34*b* from above.

The front end of the upper part 76 is positioned at the boundary between the upper step part 34*a* and the lower step part 34*b*. In other words, the upper part 76 covers only the lower step part 34*b*, and does not cover the upper step part 34*a*. The upper part 76 does not contact the housing 31. As a result, the heat dissipation plate 70 suppresses conduction of heat from the upper part 76 to the housing 31.

As shown in FIGS. 6 and 7, the upper part 76 is positioned lower than the upper step part 34*a*. As a result, the upper part 76 is not visible when the light source module 30 is viewed from the front surface 33 side. Accordingly, the appearance of the light source module 30 and the vehicle light fixture 10 can be improved.

The left part 77 extends along the left side surface 35 of the housing 31. Specifically, the left part 77 extends along the lower step part 35*b* in a state in which a gap S2 is formed between the left part 77 and the lower step part 35*b* of the left side surface 35. In other words, the left part 77 is positioned leftward of the lower step part 35*b*, and extends parallel to the lower step part 35*b*.

The left part 77 covers a part of the lower step part 35*b* from the left. Specifically, as shown in FIG. 6, the left part 77 covers only the upper part of the lower step part 35*b* of the left side surface 35 of the housing 31. In other words, the lower step part 35*b* of the left side surface 35 of the housing 31 includes the covered part 32*a* covered with the left part 77, and the exposed part 32*b* that is exposed externally.

The front end of the left part 77 is positioned at the boundary between the upper step part 35*a* and the lower step part 35*b*. In other words, the left part 77 covers only a part of the lower step part 35*b*, and does not cover the upper step part 35*a*. The left part 77 does not contact the housing 31. As a result, the heat dissipation plate 70 suppresses conduction of heat from the left part 77 to the housing 31.

As shown in FIG. 7, the left part 77 is positioned further rightward than the upper step part 35*a*. As a result, the left part 77 is not visible when the light source module 30 is viewed from the front surface 33 side. Accordingly, the appearance of the light source module 30 and the vehicle light fixture 10 can be improved.

The right part 78 extends along the right side surface 36 of the housing 31. Specifically, the right part 78 extends along the lower step part 36*b* in a state in which a gap S3 is formed between the right part 78 and the lower step part 36*b* of the right side surface 36. In other words, the right part 78 is positioned rightward of the lower step part 36*b*, and extends parallel to the lower step part 36*b*.

The right part 78 covers the lower step part 36*b* from the right. Specifically, as shown in FIG. 2, the right part 78 covers the greater part of the right side surface 36 of the housing 31. The right part 78 may cover one part of the right side surface 36 of the housing 31.

The front end of the right part 78 is positioned at the boundary between the upper step part 36*a* and the lower step part 36*b*. In other words, the right part 78 covers the lower step part 36*b*, and does not cover the upper step part 35*a*. The right part 78 does not contact the housing 31. As a result, the heat dissipation plate 70 suppresses conduction of heat from the right part 78 to the housing 31.

As shown in FIG. 7, the right part 78 is positioned further leftward than the upper step part 36*a*. As a result, the right part 78 is not visible when the light source module 30 is viewed from the front surface 33 side. Accordingly, the appearance of the light source module 30 and the vehicle light fixture 10 can be improved.

The heat dissipation plate 70 is attached to the light source substrate 40 by the screws 80. Specifically, the heat dissipation plate 70 is attached by the screws 80 engaging the threaded holes 38*c* of the housing 31 in a state in which the mounting part 71 abuts the back surface 40*b* of the light source substrate 40.

The circuit board 90 is attached to the mounting part 71 of the heat dissipation plate 70. The circuit board 90 is formed of a metal material (e.g., an aluminum material) having a plate shape. The circuit board 90 includes insertion holes 91 through which the screws 80 for mounting the circuit board 90 to the heat dissipation plate 70 are inserted. The insertion holes 91 are located at positions corresponding to the insertion holes 73 of the mounting part 71, respectively.

The connector 95 is located at the central part of a back surface 90*a* of the circuit board 90. The connector 95 is located at a position corresponding to the connection part 23*a* located at the back surface part 23 of the slot 22. The connector 95 is connected to the connection part 23*a* when the light source module 30 is mounted in the slot 22. The light-emitting element 50 is lit by power supplied from the connector 95 via the connection part 23*a*. The light source substrate 40 is connected to the circuit board 90 via an electrical wire (not shown). As shown in FIGS. 5, 9, 10, 11, 12, and 13, the light source substrate 40 includes a through hole 43 through which the electrical wire is extends. The mounting part 71 incudes a through hole 74 through which the electrical wire extends. The circuit board 90 includes a through hole 92 through which the electrical wire extends.

An assembly work of the light source module 30 will be described below.

First, the optical component 60 is placed inside the housing 31; and the member forming the upper surface 34 is screwed to the member forming the left side surface 35 and the right side surface 36. Then, the light source substrate 40 is mounted to the back surface 38 of the housing 31 by engaging the screws 45 with the threaded holes 38*b* of the housing 31.

Here, if there is misalignment between the optical axes of the light source modules 30 mounted in the slots 22, the light distribution of the vehicle light fixture 10 may be undesirably shifted from the desired light distribution. To address the issue, the position of the light source substrate 40 at which the light-emitting element 50 is located with respect to the housing 31 is adjustable. Optical axis adjustment of the light source module 30 is performed before mounting in the slot 22.

As shown in FIG. 9, hole diameters D1 of the insertion holes 41 of the light source substrate 40 are formed to be greater than outer diameters D2 of the screws 45. Also, the through-hole 38*a* that is formed in the back surface 38 of the housing 31 is formed to be large enough so that the light-emitting element 50 can be moved inside the through-hole 38*a*. As a result, the light source substrate 40 can move relative to the housing 31 by the amount of the difference between the hole diameter D1 of the insertion hole 41 and the outer diameter D2 of the screw 45.

The optical axis adjustment of the light source module 30 can be performed by adjusting the position of the light-emitting element 50 by moving the light source substrate 40 with respect to the housing 31. For example, the optical axis adjustment is performed when assembling the light source module 30 in a plant, etc. The optical axis adjustment is performed by assumption of a state in which the light source module 30 is mounted in the slot 22.

As a result, the light source module 30 is shipped from the plant in a state in which the optical axis is adjusted. Accordingly, it is unnecessary to adjust the optical axis of the light source module 30 when mounting the light source module 30 in the slot 22 of the main part 20; and efficiency of the mounting work can be improved.

Then, the heat dissipation plate 70 and the circuit board 90 are mounted to the housing 31. Specifically, the mounting part 71 of the heat dissipation plate 70 is placed to abut the back surface 40*b* of the light source substrate 40. In such a case, the heads of the screws 45 mounting the light source substrate 40 to the housing 31 are positioned inside the holes 72 of the mounting part 71. Then, the heat dissipation plate 70 and the circuit board 90 can be mounted to the housing 31 by engaging the screws 80 with the threaded holes 38*c* of the housing 31 in a state in which the circuit board 90 abuts the back surface 71*b* of the mounting part 71.

If the light source substrate 40 and the heat dissipation plate 70 are mounted using the same screws, the light source substrate 40 and the heat dissipation plate 70 must be moved together when performing the optical axis adjustment; and therefore the efficiency of performing the optical axis adjustment work may be negatively affected. In the light source module 30, the heat dissipation plate 70 is mounted with the screws 80 after the light source substrate 40 is mounted with the screws 45. Accordingly, the efficiency of the assembly work of the light source module 30 can be improved.

The heat dissipation plate 70 includes the mounting part 71 mounted to the light source substrate 40, and the extension part 75 extending from the mounting part 71 along a part of the outer surface 32 of the housing 31. In other words, the extension part 75 covers a part of the outer surface 32 of the housing 31. As a result, the area of the heat dissipation plate 70 for dissipating heat can be as wide as possible; and the light source module 30 can be smaller.

The heat dissipation plate 70 contacts only the light source substrate 40, and does not contact the housing 31. As a result, the heat that is conducted from the light source substrate 40 to the mounting part 71 is less likely to be conducted from conducting from the extension part 75 to the housing 31. Accordingly, the thermal effects of the light source module 30 on the optical component 60 located inside the housing 31, etc., can be suppressed.

As shown in FIG. 7, the housing 31 includes a shielding part 39 located further toward the front surface 33 side than the heat dissipation plate 70. The heat dissipation plate 70 is concealed by the shielding part 39 when the light source module 30 is viewed from the front surface 33 side.

The shielding part 39 includes the front surface 33, the upper step part 34*a* of the upper surface 34, the upper step part 35*a* of the left side surface 35, and the upper step part 36*a* of the right side surface 36 of the housing 31. In other words, the heat dissipation plate 70 is positioned behind the front surface 33. In other words, the exterior shape of the front surface 33 of the housing 31 is formed to be larger than the exterior shape of the heat dissipation plate 70. As a result, as shown in FIG. 1, the appearance of the vehicle light fixture 10 can be improved because the heat dissipation plate 70 is concealed by the shielding part 39 when the automobile 100 is viewed from the front.

A mounting work of mounting the light source module 30 in the slot 22 of the main part 20 will be described below.

The outer surface 32 of the housing 31 includes the covered part 32*a* covered with the extension part 75, and the exposed part 32*b* that is exposed externally. A part of the exposed part 32*b* is used to align the light source module 30 with respect to the slot 22 when mounting the light source module 30 in the slot 22. In other words, the housing 31 is aligned with respect to the slot 22 by at least a part of the exposed part 32*b* contacting the slot 22.

In the example, the exposed part 32*b* includes a first surface 32*b*1 and the second surface 32*b*2 extending from the first surface 32*b*1. The housing 31 is aligned with respect to the slot 22 by the first and second surfaces 32*b*1 and 32*b*2 butting against the slot 22. In the example, the first surface 32*b*1 is the lower surface 37 of the housing 31. The second surface 32*b*2 is the part of the lower step part 35*b* of the left side surface 35 of the housing 31 that is lower than the left part 77 of the heat dissipation plate 70.

In the light source module 30 as shown in FIG. 3, the first surface 32*b*1 butts against the bottom surface part 24*a* of the slot 22; and the second surface 32*b*2 butts against the first section 24*b*1 of the vertical surface part 24*b*. The connector 95 is connected to the connection part 23*a* of the back surface part 23 in this state. As a result, the light source module 30 is aligned with respect to the slot 22.

When the light source module 30 is located in the slot 22, the upper step parts 34*a*, 35*a*, and 36*a* of the housing 31 are positioned further frontward than the front end of the mounting part 24. As a result, backward movement of the housing 31 is restricted by the boundary part between the upper step part 35*a* and the lower step part 35*b* of the left side surface 35 abutting the front surface of the vertical surface part 24*b*. Accordingly, the connector 95 of the light source module 30 can be prevented from being pressed more than necessary toward the connection part 23*a*.

The alignment of the light source module 30 is defined not with the heat dissipation plate 70, but with the exterior shape of the housing 31. In other words, the heat dissipation plate 70 does not contact the slot 22. As a result, the light source module 30 can be aligned without affecting the patterning accuracy of the heat dissipation plate 70.

The optical axis adjustment of the light source module 30 is performed when assembling in the plant, etc. Accordingly, desired light distributions of the vehicle light fixture 10 can be obtained merely by aligning the light source modules 30 in the slots 22. Accordingly, a light source module that is easy to mount can be provided.

The vehicle light fixture 10 forms desired light distributions at a desired distance by combining the light distributions of the multiple light source modules 30. In such a case, the vehicle light fixture 10 can form desired light distributions at the desired distance by locating the multiple light source modules 30 in any of the slots 22.

As shown in FIGS. 2 and 3, for example, the main part 20 includes the multiple slots 22 (e.g., a first slot **22*a* and a second slot 22*b*). A first light source module 30*a* is located inside the first slot 22*a*. A second light source module 30*b* is located inside the second slot 22*b*. For example, the light distribution characteristics of the first light source module 30*a* are different from the light distribution characteristics of the second light source module 30*b***.

The first slot **22*a* and the second slot 22*b* have the same shape and configuration. Also, the housings 31 of the first and second light source modules 30*a* and 30*b* have the same shape and configuration. Accordingly, the first light source module 30*a* is configured to be located inside the second slot 22*b*; and the second light source module 30*b* is configured to be located inside the first slot 22*a*. In other words, the vehicle light fixture 10 can form desired light distributions at the desired distance even when the locations of the first and second light source modules 30*a* and 30*b* are interchanged. As a result, in the automobile 100, the working efficiency of the work of mounting the light source modules 30 in the slots 22 can be improved because the light source module 30 that is located in each slot 22** is not designated.

An example is described in the embodiments above in which the extension part 75 of the heat dissipation plate 70 includes the upper part 76, the left part 77, and the right part 78. However, aspects of the invention are not limited thereto; for example, the extension part 75 of the heat dissipation plate 70 may include a lower part extending frontward from the lower end of the mounting part 71. The lower part extends along the lower surface 37 of the housing 31 in a state in which a gap is formed between the lower part and the lower surface 37 of the housing 31.

An example is described in the embodiments above in which the first surface **32*b*1 of the exposed part 32*b* is the lower surface 37; and the second surface 32*b*2 is a part of the lower step part 35*b* of the left side surface 35. However, aspects of the invention are not limited thereto; for example, the entire lower step part 35*b* may be the second surface. At least a part of the lower step part 35*b* of the right side surface 36 may be used as the second surface. When the right side surface 36 is the second surface, the vertical surface part 24*b* of the slot 22 extends upward from the right end of the bottom surface part 24*a*. A part of the lower surface 37** may be the first surface.

For example, the first surface may be at least a part of the upper surface 34; and the second surface may be at least a part of the left side surface 35 or at least a part of the right side surface 36. In such a case, the slot 22 includes a top surface part abutting the first surface (i.e., the upper surface 34), and a vertical surface part abutting the second surface (i.e., the left side surface 35 or the right side surface 36). In such a case, the light source module 30 is aligned by the first surface butting against the top surface part, and the second surface butting against the vertical surface part.

An example is described in the embodiments above in which the light source module 30 is aligned by the first and second surfaces **32*b*1 and 32*b*2 of the outer surface 32 of the housing 31 butting against the slot 22. However, aspects of the invention are not limited thereto; for example, the exposed part 32*b* may include an aligning part such as a projection, recess, or the like provided in the outer surface 32 of the housing 31**. The light source module may be aligned with respect to the slot by this aligning part contacting the slot. For example, the light source slot may be aligned by the projection or recess engaging a recess or projection of the slot.

An example of a headlamp of the automobile 100 is illustrated in embodiments, but is not limited thereto. For example, the light source module 30 can be utilized for various functions such as communication lamps, daytime running lamps, turning indicators, fog lamps, etc. In such a case, the vehicle light fixture 10 may include lamps for multiple functions (e.g., a headlamp and a turning indicator) inside the main part 20. In such a case, the light source module 30 uses the same housing 31 even when the functions are different. Also, the slots 22 of the main part 20 have the same shape and configuration.

For example, the multiple light source modules 30 may include the first and second light source modules used as a headlamp, a third light source module used as a communication lamp, and a fourth light source module used as a turning indicator, so that the functions are different between the first and second light source modules and the other light source modules. In such a case, the light emission colors may be different between the first and second light source modules and the other light source modules.

Figure 14:
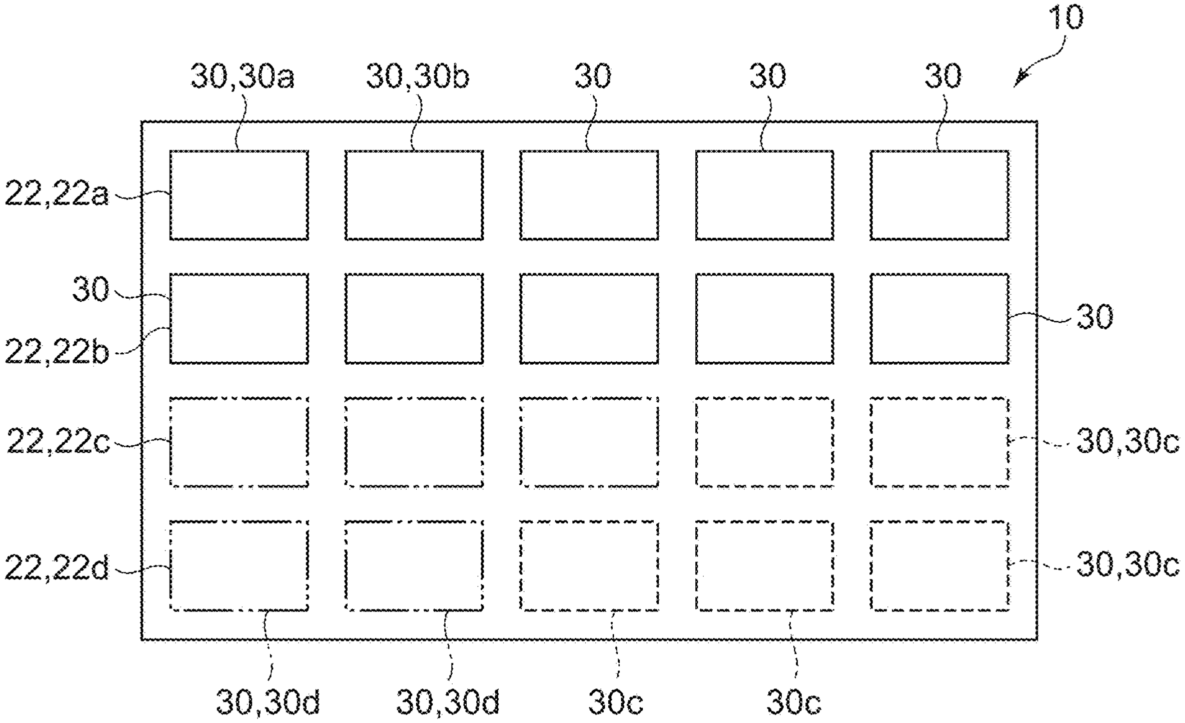
FIG. 14 illustrates a front view of the vehicle light fixture according to an example when lamps of multiple functions are included in the vehicle light fixture.

FIG. 14 illustrates a front view of the vehicle light fixture according to an example when lamps of multiple functions are included in the vehicle light fixture.

Figure 15:
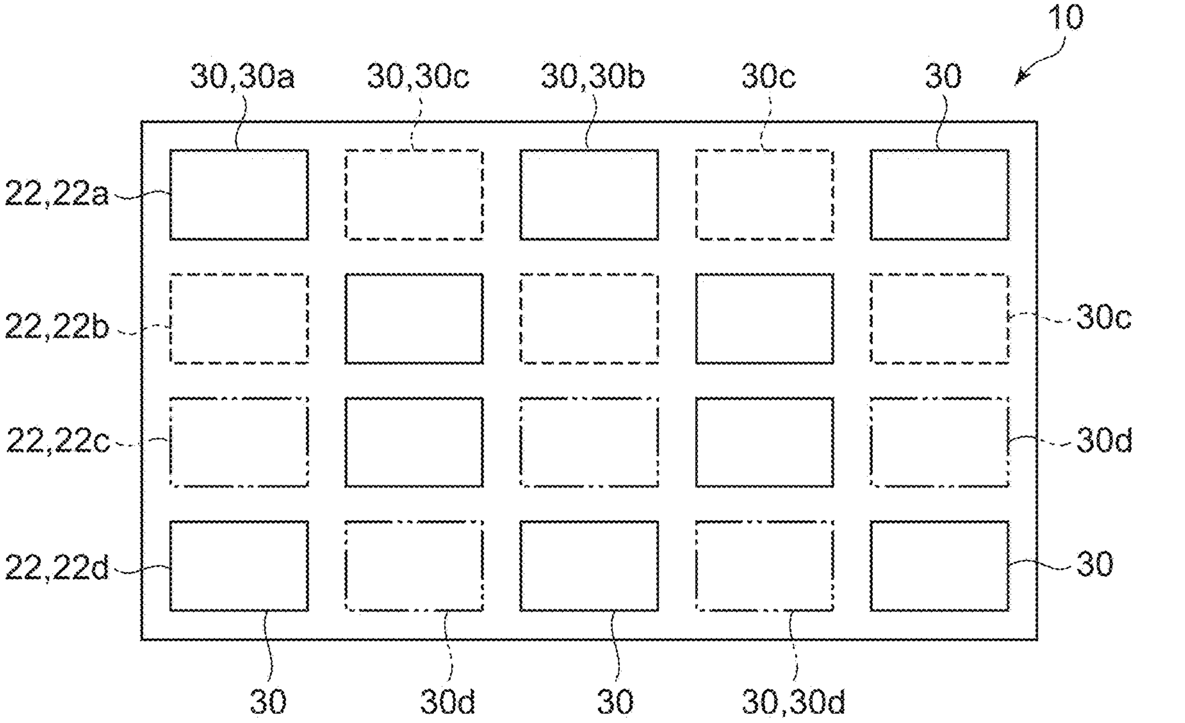
FIG. 15 illustrates a front view of the vehicle light fixture according to another example when the arrangement of the light source modules in FIG. 14 is modified.

FIG. 15 illustrates a front view of the vehicle light fixture according to another example when the arrangement of the light source modules in FIG. 14 is modified.

For example, when the main part 20 of the vehicle light fixture 10 includes twenty slots 22 and twenty light source modules 30 corresponding to the slots 22, ten light source modules 30 of the twenty light source modules 30 may be used as a headlamp, five light source modules 30 may be used as a daytime running lamp, and the remaining five light source modules 30 may be used as a turning indicator.

The light source modules 30 (e.g., the first light source modules **30*a* and the second light source modules 30*b*) used as the headlamp are illustrated by solid lines in FIGS. 14 and 15. The light source modules 30 (e.g., third light source modules 30*c*) used as the daytime running lamp are illustrated by dotted lines in FIGS. 14 and 15. The light source modules 30 (e.g., fourth light source modules 30*d*) used as the turning indicator are illustrated by double dot-dash lines in FIGS. 14 and 15**.

The multiple third light source modules **30*c* may have the same light distribution characteristics or may have different light distribution characteristics. The multiple fourth light source modules 30*d* may have the same light distribution characteristics or may have different light distribution characteristics. The multiple light source modules 30 that are used as the headlamp may include multiple first light source modules 30*a* and multiple second light source modules 30*b*** having different light distribution characteristics, and may include light source modules having different light distribution characteristics from the first and second light source modules 30*a* and 30*b*.

In FIG. 14, the headlamp is located at the upper half of the vehicle light fixture 10; and the daytime running lamp and turning indicator are located at the lower side of the headlamp. On the other hand, in FIG. 15, the light source modules of the headlamp, daytime running lamp, and turning indicator are alternately arranged. For example, when the slots 22 of the vehicle light fixture 10 are taken as the first slot 22*a*, the second slot 22*b*, a third slot 22*c*, and a fourth slot 22*d* downward from the top, the first to fourth light source modules 30*a* to 30*d* each can be mounted in any slot. Thus, multiple designs of the vehicle light fixture 10 are possible merely by modifying the arrangement of the light source modules 30.

As shown in FIGS. 14 and 15, a headlamp is formed, with a desired light distribution, no matter how the ten light source modules 30 (the first light source modules 30*a* and the second light source modules 30*b*) are arranged in the slots 22. A daytime running lamp is formed, with a desired light distribution, no matter how the five light source modules 30 (the third light source modules 30*c*) are arranged in the slots 22. A turning indicator is formed, with a desired light distribution, no matter how the remaining five light source modules 30 (the fourth light source modules 30*d*) are arranged in the slots 22.

In other words, a third slot and a third light source module are further included in addition to the first and second slots and the first and second light source modules; the third light source module has a different light emission color from the first light source module; the first light source module and the second light source module are configured to be located inside the third slot; and the third light source module is configured to be located inside the first and second slots.

Also, a fourth slot and a fourth light source module are further included; the fourth light source module has a different light emission color from the first and third light source modules; the first light source module, the second light source module, and the third light source module are configured to be located inside the fourth slot; and the fourth light source module is configured to be located inside the first, second, and third slots.

Thus, the vehicle light fixture 10 can form a desired light distribution at the desired distance to match each function, no matter how the light source modules 30 are arranged in the twenty slots 22. Accordingly, the arrangement of the light source modules 30 can be freely determined in the vehicle light fixture 10; and the design degree of freedom is increased.

In such a case, the light source modules 30 used as the daytime running lamp may be taken as the third light source module; the light source modules 30 used as the turning indicator may be taken as the fourth light source module; and two of the twenty slots 22 may be taken as the third slot and the fourth slot. That is, the automobile 100 may include the first, third, and fourth light source modules that have mutually-different functions; and the first to fourth light source modules are configured to be located in any of the first to fourth slots.

For example, the invention can be utilized in light sources of vehicle light fixtures.

What is claimed is:

1. A light source module, comprising:
- a housing;
- a light source substrate mounted to the housing;
- a light-emitting element disposed on the light source substrate;
- an optical component provided inside the housing, light irradiated from the light-emitting element traveling through the optical component and exiting out of a front surface of the housing; and
- a heat dissipation plate mounted to the light source substrate,
- the heat dissipation plate including:
  - a mounting part mounted to the light source substrate; and
  - an extension part extending from the mounting part along an outer surface of the housing,
- the outer surface of the housing including:
  - a covered part covered with the extension part; and
  - an exposed part not covered with the extension part.

2. The light source module according to claim 1, wherein the heat dissipation plate does not contact the housing.

3. The light source module according to claim 1, wherein
- the housing includes a shielding part located further toward a front side than the heat dissipation plate, and
- the heat dissipation plate is concealed by the shielding part when viewed from the front side.

4. The light source module according to claim 1, wherein a position of the light source substrate with respect to the housing is adjustable.

5. The light source module according to claim 1, wherein the heat dissipation plate comprises a one-piece metal plate that is bent into a plurality of parts including the mounting part and the extension part.

6. The light source module according to claim 5, wherein the one-piece metal plate covers at least a part of a back surface of the housing, and at least a part of at least one of an upper surface, a left side surface, or a right side surface of the housing.

7. The light source module according to claim 5, wherein the extension part includes a first part that extends from the mounting part along a first outer surface of the housing and a second part that extends from the first part along a second outer surface of the housing.

8. The light source module according to claim 7, wherein the extension part further includes a third part that extends from the mounting part along a third outer surface of the housing.

9. The light source module according to claim 8, wherein the third outer surface of the housing is opposite to the second outer surface of the housing.

10. The light source module according to claim 1, wherein the mounting part of the heat dissipation plate is in thermal contact with the light source substrate.

11. The light source module according to claim 10, wherein a gap is formed between the extension part of the heat dissipation plate and the covered part of the outer surface of the housing.

12. The light source module according to claim 1, wherein
- the light source substrate is mounted to the housing with a screw, and
- the mounting part of the heat dissipation plate includes a hole in which a screw head of the screw is fit.

13. A vehicle light fixture, comprising:
- a main part including an array of slots in a matrix form including a plurality of rows and a plurality of columns, the array of slots including a first slot, a second slot, a third slot, and a fourth slot; and a plurality of light source modules including:

a first light source module attached to the first slot;

a second light source module attached to the second slot;

a third light source module attached to the third slot; and a fourth light source module attached to the fourth slot, a light distribution characteristic of the first light source module being different from a light distribution characteristic of the second light source module, the first light source module being attachable to the second slot, the second light source module being attachable to the first slot, wherein a first part of the plurality of light source modules attached to slots in a first region of the array that includes the first and second slots is a headlamp, a second part of the plurality of light source modules attached to slots in a second region of the array that includes the third slot is a daytime running lamp, and a third part of the plurality of light source modules attached to slots in a third region of the array that includes the fourth slot is a turning indicator.

14. The vehicle light fixture according to claim 13, wherein a light emission color of the third light source module is different from a light emission color of the first light source module, each of the first light source module and the second light source module is attachable to the third slot, the third light source module is attachable to each of the first and second slots.

15. The vehicle light fixture according to claim 14, wherein a light emission color of the fourth light source module is different from the light emission colors of the first and third light source modules, each of the first light source module, the second light source module, and the third module is attachable to the fourth slot, the fourth light source module is attachable to each of the first, second, and third slots.

16. An automobile, comprising:

the vehicle light fixture according to claim 13.

17. A vehicle light fixture, comprising:

a main part including a first slot and a second slot;

a first light source module attached to the first slot; and a second light source module attached to the second slot, a light distribution characteristic of the first light source module being different from a light distribution characteristic of the second light source module, the first light source module being attachable to the second slot, the second light source module being attachable to the first slot, wherein each of the first and second light source modules comprises:

a housing;

a light source substrate mounted to the housing;

a light-emitting element disposed on the light source substrate;

an optical component provided inside the housing, light irradiated from the light-emitting element traveling through the optical component and existing out of a front surface of the housing; and a heat dissipation plate mounted to the light source substrate, the heat dissipation plate including:

a mounting part mounted to the light source substrate; and an extension part extending from the mounting part along an outer surface of the housing, the outer surface of the housing including:

a covered part covered with the extension part; and an exposed part not covered with the extension part.

18. The vehicle light fixture according to claim 17, wherein, in the first light source module, the housing is aligned with the first slot by at least a part of the exposed part being in contact with the first slot.

19. The vehicle light fixture according to claim 17, wherein, in the first light source module, the exposed part includes a first surface and a second surface extending from the first surface, and the housing is aligned with the first slot by the first and second surfaces being in contact with the first slot.

20. An automobile, comprising:

the vehicle light fixture according to claim 17.

* * * * *